United States Patent
Ohwa (10) Patent No.: US 10,275,852 B2
(45) Date of Patent: Apr. 30, 2019

(54) IMAGE PROCESSING APPARATUS, IMAGE PROCESSING METHOD, AND IMAGE CAPTURE APPARATUS THAT USE A PLURALITY OF PROCESSORS TO APPLY IMAGE PROCESSING TO RESPECTIVE DIVIDED AREAS OF AN IMAGE IN PARALLEL

(71) Applicant: CANON KABUSHIKI KAISHA, Tokyo (JP)

(72) Inventor: Yasushi Ohwa, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/703,017

(22) Filed: Sep. 13, 2017

(65) Prior Publication Data
US 2018/0089792 A1    Mar. 29, 2018

(30) Foreign Application Priority Data

Sep. 28, 2016  (JP) ................. 2016-189920

(51) Int. Cl.
*G06T 1/20* (2006.01)
*G06T 5/50* (2006.01)
*H04N 5/232* (2006.01)

(52) U.S. Cl.
CPC ............... *G06T 1/20* (2013.01); *G06T 5/50* (2013.01); *H04N 5/23229* (2013.01)

(58) Field of Classification Search
None
See application file for complete search history.

(56) References Cited

U.S. PATENT DOCUMENTS

| 2014/0093182 | A1* | 4/2014 | Arai | H04N 19/80 382/235 |
| 2014/0193095 | A1* | 7/2014 | Choe | G06T 5/002 382/274 |
| 2015/0310593 | A1* | 10/2015 | Kobayashi | G06T 5/002 382/275 |
| 2016/0300330 | A1* | 10/2016 | Roffet | G06T 5/003 |
| 2017/0132756 | A1* | 5/2017 | Campbell | G06T 3/4015 |
| 2017/0214884 | A1* | 7/2017 | Tatsumi | H04N 5/208 |

FOREIGN PATENT DOCUMENTS

JP     2011-043658 A     3/2011

* cited by examiner

*Primary Examiner* — Jeffrey J Chow
(74) *Attorney, Agent, or Firm* — Cowan, Liebowitz & Latman, P.C.

(57) ABSTRACT

In executing image processing using low-frequency band evaluation values and high-frequency band evaluation values obtained from an input image, one of a plurality of processors applies the image processing to a partial image assigned thereto using high-frequency band evaluation values obtained from the partial image and low-frequency band evaluation values. This processor distributes, to another processor, low-frequency band evaluation values or a reduced image of the input image to be used by another processor. Another processor applies the image processing to a partial image assigned thereto using high-frequency band evaluation values obtained from the partial image and one selected from the group consisting of the distributed low-frequency band evaluation values and low-frequency band evaluation values obtained from the reduced image, and returns a resultant image.

16 Claims, 5 Drawing Sheets

IMAGE PROCESSING APPARATUS, IMAGE PROCESSING METHOD, AND IMAGE CAPTURE APPARATUS THAT USE A PLURALITY OF PROCESSORS TO APPLY IMAGE PROCESSING TO RESPECTIVE DIVIDED AREAS OF AN IMAGE IN PARALLEL

BACKGROUND OF THE INVENTION

Field of the Invention

The present invention relates to an image processing apparatus, an image processing method, and an image capture apparatus.

Description of the Related Art

An amount of image data to be processed per unit time is increasing due to an increase in the number of pixels of an image sensor, an increase in a frame rate of moving images, and the like. Japanese Patent Laid-Open No. 2011-43658 discloses a configuration in which a display image is divided into left and right halves, and separate panel driving LSIs share execution of processes for image data of an area corresponding to the right half and image data of an area corresponding to the left half; in this way, high frame rate display can be realized on an LCD panel.

However, in the configuration disclosed in Japanese Patent Laid-Open No. 2011-43658, each LSI needs to process image data of an area larger than the divided area assigned thereto when, for example, it is necessary to obtain a feature amount related to the area larger than the divided area. Especially, in order to obtain a feature amount of a low-frequency area of an image, image data of a wide range (e.g., a range corresponding to one screen) is necessary, which creates the problem of reduction in the efficiency of a dividing process.

SUMMARY OF THE INVENTION

The present invention has been made in view of the foregoing problem with the conventional technique. In an image processing apparatus and an image processing method that use a plurality of processors to apply image processing to respective divided areas of an image in parallel, the present invention moderates a reduction in the processing efficiency when in need of a feature amount related to an image area larger than a divided area.

According to an aspect of the present invention, there is provided an image processing apparatus that applies image processing to an input image through parallel processing by a plurality of processors that are respectively assigned to partial images of the input image, wherein the image processing uses a low-frequency band (LF) evaluation value and a high-frequency band (HF) evaluation value that are obtained from the input image, among the plurality of processors, one processor applies the image processing to a partial image assigned thereto using a HF evaluation value obtained from the partial image and a LF evaluation value, and distributes, to another processor, a LF evaluation value or a reduced image of the input image to be used by the other processor, the other processor applies the image processing to a partial image assigned thereto using (i) a HF evaluation value obtained from the partial image and (ii) one of the distributed LF evaluation value and a LF evaluation value obtained from the distributed reduced image, and transmits a resultant image to the one processor, and the one processor generates an image representing a result of applying the image processing to the input image from the partial image to which the one processor has applied the image processing and the partial image to which the other processor has applied the image processing.

According to another aspect of the present invention, there is provided an image capture apparatus, comprising: an image sensor; and an image processing apparatus that applies image processing to an input image obtained by the image sensor, wherein the image processing apparatus applies the image processing to the input image through parallel processing by a plurality of processors that are respectively assigned to partial images of the input image, wherein the image processing uses a low-frequency band (LF) evaluation value and a high-frequency band (HF) evaluation value that are obtained from the input image, among the plurality of processors, one processor applies the image processing to a partial image assigned thereto using a HF evaluation value obtained from the partial image and a LF evaluation value, and distributes, to another processor, a LF evaluation value or a reduced image of the input image to be used by the other processor, the other processor applies the image processing to a partial image assigned thereto using (i) a HF evaluation value obtained from the partial image and (ii) one of the distributed LF evaluation value and a LF evaluation value obtained from the distributed reduced image, and transmits a resultant image to the one processor, and the one processor generates an image representing a result of applying the image processing to the input image from the partial image to which the one processor has applied the image processing and the partial image to which the other processor has applied the image processing.

According to a further aspect of the present invention, there is provided an image processing method that applies image processing to an input image through parallel processing by a plurality of processors that are respectively assigned to partial images of the input image, wherein the image processing uses a low-frequency band evaluation value and a high-frequency band evaluation value that are obtained from the input image, among the plurality of processors, one processor applies the image processing to a partial image assigned thereto using a high-frequency band evaluation values obtained from the partial image and a low-frequency band evaluation value, and distributes, to another processor, a low-frequency band evaluation value or a reduced image of the input image to be used by the other processor, the other processor applies the image processing to a partial image assigned thereto using (i) a high-frequency band evaluation value obtained from the partial image and one of the distributed low-frequency band evaluation value and a low-frequency band evaluation value obtained from the distributed reduced image, and transmits a resultant image to the one processor, and the one processor generates an image representing a result of applying the image processing to the input image from the partial image to which the one processor has applied the image processing and the partial image to which the other processor has applied the image processing.

According to another aspect of the present invention, there is provided a non-transitory computer-readable medium having stored therein a program for causing a plurality of processors included in a computer to function as a plurality of processors of an image processing apparatus that applies image processing to an input image through parallel processing by the plurality of processors that are respectively assigned to partial images of the input image, wherein the image processing uses a low-frequency band (LF) evaluation value and a high-frequency band (HF) evaluation value that are obtained from the input image, among the plurality of processors, one processor applies the image processing to a partial image assigned thereto using a HF evaluation value obtained from the partial image and a LF evaluation value, and distributes, to another processor, a LF evaluation value or a reduced image of the input image to be used by the other processor, the other processor applies the image processing to a partial image assigned thereto using (i) a HF evaluation value obtained from the partial image and (ii) one of the distributed LF evaluation value and a LF evaluation value obtained from the distributed reduced image, and transmits a resultant image to the one processor, and the one processor generates an image representing a result of applying the image processing to the input image from the partial image to which the one processor has applied the image processing and the partial image to which the other processor has applied the image processing.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings. Note that the following embodiments pertain to a case in which an image processing apparatus according to the present invention is applied to a digital camera, which is one example of an image capture apparatus. However, components related to image capture are not essential to the present invention. For example, image data that has already been recorded as a data file of any format may be obtained from a storage apparatus or an external apparatus.

First Embodiment

Figure 1:
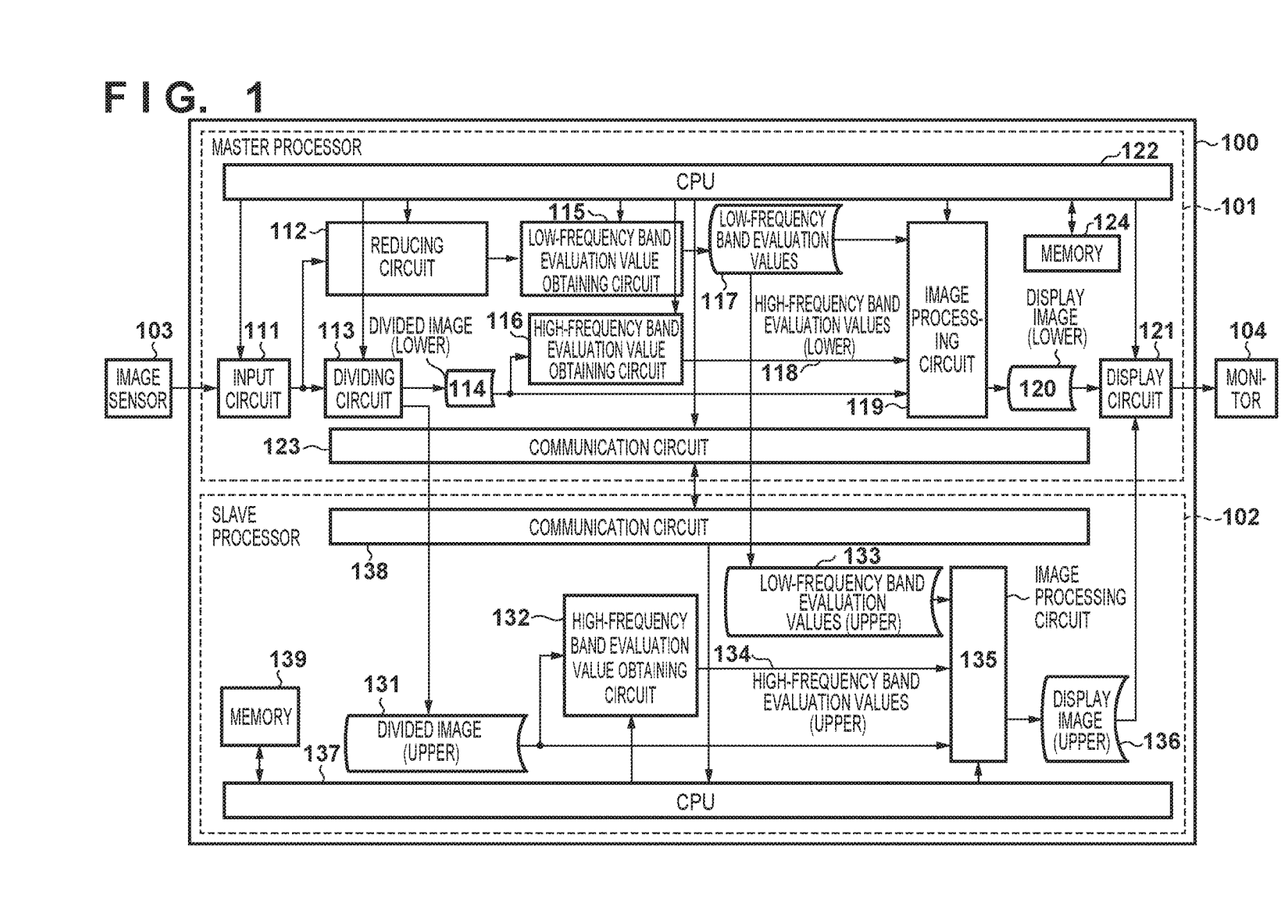
FIG. 1 is a block diagram showing an exemplary functional configuration of a digital camera according to a first embodiment of the present invention.

FIG. 1 is a block diagram showing an exemplary functional configuration of a digital camera according to a first embodiment in connection with generation and output of display image data. An image sensor 103 generates image data, and outputs the image data to an image processing apparatus 100. In the image sensor 103, a plurality of pixels with a photoelectric conversion function are arrayed, and each pixel converts an optical image formed by a lens unit into an electrical signal (pixel signal) and outputs the electrical signal (pixel signal). A group of pixel signals output from the image sensor 103 will be referred to as an image signal.

The image processing apparatus 100 includes a plurality of processors. In the present embodiment, it includes a master processor 101 and a slave processor 102. The image signal output from the image sensor 103 is input as an input image to the master processor 101. In the present embodiment, the master processor 101 and the slave processor 102 are both programmable processors. Alternatively, the master processor 101 and the slave processor 102 can be implemented using application specific standard products (ASSPs), application specific integrated circuits (ASICs), system LSIs, and the like.

A monitor 104 displays a display image output from the master processor 101. The monitor 104 is a display apparatus, such as a liquid crystal display and a TV monitor. The monitor 104 may be an external display apparatus connected to the digital camera.

A configuration of the master processor 101 will now be described.

A CPU 122 realizes processes executed by the master processor 101 by reading programs stored in a nonvolatile area of a memory 124 into a volatile area of the memory 124 and executing the read programs. One or more of function blocks (circuits) included in the master processor 101 may be realized by the CPU 122 executing the programs.

A communication circuit 123 is connected to a communication circuit 138 of the slave processor 102 in such a manner that they can communicate with each other, thereby realizing data communication between the master processor 101 (CPU 122) and the slave processor 102 (CPU 137).

An input circuit 111 outputs the image signal from the image sensor 103 to a reducing circuit 112 and a dividing circuit 113. When the input image signal is in an analog format, the input circuit 111 may apply A/D conversion to the input image signal.

The reducing circuit 112 applies a known reducing process, such as a thinning process, to the image signal, and outputs the resultant image signal with reduced resolution (a reduced image or $IMG_R$) to a low-frequency band evaluation value (LFEV) obtaining circuit 115.

The LFEV obtaining circuit 115 obtains low-frequency band evaluation values (LFEV) by performing predetermined calculation with respect to the reduced image output from the reducing circuit 112, and outputs the obtained low-frequency band evaluation values as LFEV 117. The CPU 122 temporarily writes LFEV 117 to the memory 124, and transmits the same to the slave processor 102 via the communication circuit 123. This enables the slave processor 102 to use LFEV 117 in image processing for a divided image (upper) or $IMG_{DIV}(U)$. Note that the CPU 122 can transmit, to the slave processor 102, only a predetermined part of LFEV 117 that is necessary for the image processing for the divided image (upper). Hereinafter, a part of LFEV 117 that is transmitted to the slave processor 102 will be referred to as LFEV(U) 133.

The dividing circuit 113 divides the image signal corresponding to one screen into image signals that are in one-to-one correspondence with divided areas (partial images). In the present embodiment, it will be assumed that the dividing circuit 113 divides one screen into an upper area and a lower area that partially overlap, and outputs an image signal corresponding to the upper divided area (a divided image (upper) or $IMG_{DIV}(U)$) and an image signal corresponding to the lower divided area (a divided image (lower) or $IMG_{DIV}(L)$), for example. It will also be assumed that the master processor 101 and the slave processor 102 process IMG$_{DIV}$(L) and IMG$_{DIV}$(U), respectively. The input circuit 111 and the dividing circuit 113 may be configured separately from the master processor 101.

In the present embodiment, although the master processor 101 generates an image corresponding to the lower half and the slave processor 102 generates an image corresponding to the upper half, an image of an area larger than half is required to obtain evaluation values that are necessary for the generation. The dividing circuit 113 generates IMG$_{DIV}$(U) 131 and IMG$_{DIV}$(L) 114 by cropping out images of areas that are necessary for the master processor 101 and the slave processor 102 to obtain evaluation values related to high-frequency areas of the image. The areas necessary for obtaining the evaluation values related to the high-frequency areas of the image are smaller than areas necessary for obtaining evaluation values related to low-frequency areas of the image. In the present embodiment, rather than obtaining the evaluation values related to the low-frequency areas of the image in both of the master processor 101 and the slave processor 102 on a per-processor basis, the evaluation values obtained by the master processor 101 are provided to the slave processor 102. This can reduce an overlapped area in which IMG$_{DIV}$(U) 131 and IMG$_{DIV}$(L) 114 overlap, and moderate a reduction in the processing efficiency.

When separate processors each process a different one of divided areas of the image in parallel, high-speed processing can be executed compared with when one processor processes the entire image. The dividing circuit 113 temporarily writes IMG$_{DIV}$(L) 114 to the memory 124. The dividing circuit 113 also outputs IMG$_{DIV}$(U) 131 to the communication circuit 123. The communication circuit transmits IMG$_{DIV}$(U) 131 to the slave processor 102.

A high-frequency band evaluation value (HFEV) obtaining circuit 116 reads out IMG$_{DIV}$(L) 114 from the memory 124, obtains high-frequency band evaluation values (HFEV) by performing predetermined calculation, and outputs the obtained high-frequency band evaluation values as HFEV (L) 118 to an image processing circuit 119.

The image processing circuit 119 applies image processing to IMG$_{DIV}$(L) 114 that has been read out from the memory 124 using LFEV 117 that has been read out from the memory 124 and HFEV(L) 118 that has been input from the HFEV obtaining circuit 116.

Examples of the image processing that the image processing circuit 119 applies to IMG$_{DIV}$(L) 114 include, but are not limited to, noise removal, color interpolation, tone mapping, matrix conversion, gamma correction, scaling, and so forth. Although it will be assumed herein that the image processing circuit 119 executes image processing for generating display image data (a display image (lower) or IMG$_{DISP}$(L) 120), it may execute image processing for generating image data to be recorded. The image processing circuit 119 temporarily writes generated IMG$_{DISP}$(L) 120 to the memory 124.

No particular restriction is intended regarding how the image processing circuit 119 uses LFEV 117 and HFEV(L) 118 in image processing. For example, the image processing circuit 119 can use LFEV 117 and HFEV(L) 118 to determine gain characteristics in tone mapping.

A display circuit 121 may be, for example, a display controller provided with a built-in VRAM, writes IMG$_{DISP}$(L) 120 that has been read out from the memory 124 to the VRAM, and writes a display image (upper) or IMG$_{DISP}$(U) 138 that has been received from the slave processor 102 to the VRAM. The display circuit 121 then outputs a display signal from the VRAM to the monitor 104.

Although it is possible to perform writing and reading of data to and from the memory 124 in parallel, the CPU 122 controls writing and reading of data to and from the memory 124 so as to avoid reading of unwritten data, for example.

A configuration of the slave processor 102 will now be described.

The CPU 137 realizes processes executed by the slave processor 102 by reading programs stored in a nonvolatile area of a memory 139 into a volatile area of the memory 139 and executing the read programs. One or more of function blocks (circuits) included in the slave processor 102 may be realized by the CPU 137 executing the programs.

The communication circuit 138 is connected to the communication circuit 123 of the master processor 101 in such a manner that they can communicate with each other, thereby realizing data communication between the slave processor 102 (CPU 137) and the master processor 101 (CPU 122).

The CPU 137 temporarily writes IMG$_{DIV}$(U) 131 and LFEV(U) 133 that have been received via the communication circuit 138 to the memory 139.

An HFEV obtaining circuit 132 reads out IMG$_{DIV}$(U) 131 from the memory 139. Then, the HFEV obtaining circuit 132 obtains high-frequency band evaluation values by performing predetermined calculation with respect to IMG$_{DIV}$(U) 131, similarly to the HFEV obtaining circuit 116, and outputs the obtained high-frequency band evaluation values as HFEV(U) 134 to an image processing circuit 135.

The image processing circuit 135 applies image processing to IMG$_{DIV}$(U) 131 that has been read out from the memory 139 using LFEV(U) 133 that has been read out from the memory 139 and HFEV(U) 134 that has been input from the HFEV obtaining circuit 132. The image processing applied by the image processing circuit 135 to IMG$_{DIV}$(U) 131 is similar to the image processing applied by the image processing circuit 119. The image processing circuit 135 temporarily writes generated IMG$_{DISP}$(U) 136 to the memory 139.

No particular restriction is intended regarding how the image processing circuit 135 uses LFEV(U) 133 and HFEV (U) 134 in image processing. For example, the image processing circuit 135 can use LFEV 133 and HFEV (U) 134 to determine gain characteristics in tone mapping.

The CPU 137 reads out IMG$_{DISP}$(U) 136 from the memory 139, and transmits the same to the master processor 101 (display circuit 121) via the communication circuit 138. The display circuit 121 writes received IMG$_{DISP}$(U) 136 to the VRAM, and outputs the same, together with IMG$_{DISP}$(L) 120, as a display image corresponding to one screen to the monitor 104.

Although it is possible to perform writing and reading of data to and from the memory 139 in parallel, the CPU 137 controls writing and reading of data to and from the memory 139 so as to avoid reading of unwritten data, for example.

In the foregoing configuration, in order to generate IMG$_{DISP}$(L) 120, the image processing circuit 119 of the master processor 101 requires not only HFEV related to IMG$_{DIV}$(L) 114, but also HFEV related to an area in the vicinity of a division border (lower edge) of IMG$_{DIV}$(U) 131. For this reason, the HFEV obtaining circuit 116 requires an image of the area in the vicinity of the division border (lower edge) of IMG$_{DISP}$(U) 131 in addition to IMG$_{DIV}$(L) 114. Furthermore, when the image processing circuit 119 generates IMG$_{DISP}$(L) 120, the image of the area in the vicinity of the division border of IMG$_{DIV}$(U) 131 needs to be used as a reference area in some cases. Such an area of an adjacent divided image that is necessary for processing a certain divided image will be referred to as an overlapped area. Therefore, the dividing circuit 113 generates $IMG_{DIV}(L)$ 114 that includes the overlapped area. When the HFEV obtaining circuit 116 and the image processing circuit 119 require overlapped areas of different sizes, the dividing circuit 113 generates $IMG_{DIV}(L)$ 114 that includes the larger overlapped area.

Similarly, in order to generate $IMG_{DISP}(U)$ 138, the image processing circuit 135 of the slave processor 102 requires not only high-frequency band evaluation values related to $IMG_{DIV}(U)$ 131, but also high-frequency band evaluation values related to an area in the vicinity of a division border (upper edge) of $IMG_{DIV}(L)$ 114. For this reason, the HFEV obtaining circuit 132 requires an image of the area in the vicinity of the division border (upper edge) of $IMG_{DISP}(L)$ 114 in addition to $IMG_{DIV}(U)$ 131. Furthermore, when the image processing circuit 135 generates $IMG_{DISP}(U)$ 138, the image of the area in the vicinity of the division border of $IMG_{DIV}(L)$ 114 needs to be used as a reference area in some cases. Therefore, the dividing circuit 113 generates $IMG_{DIV}(U)$ 131 that includes an overlapped area that is necessary for processes executed by the slave processor 102. When the HFEV obtaining circuit 132 and the image processing circuit 135 require overlapped areas of different sizes, the dividing circuit 113 generates $IMG_{DIV}(U)$ 131 that includes the larger overlapped area.

The image processing circuits 119 and 135 also use low-frequency band evaluation values in generation of a display image ($IMG_{DISP}$). Obtaining low frequency band evaluation values requires an image of a range (e.g., a range corresponding to one screen) that is larger than a range required in obtaining high-frequency band evaluation values. Therefore, if the master processor 101 and the slave processor 102 obtain low-frequency band evaluation values separately from each other, an overlapped area will become even larger, and the efficiency of parallel processing will be further reduced.

For this reason, in the present embodiment, only the master processor 101 obtains low-frequency band evaluation values, and provides them to the slave processor 102 via the communication circuit 123. Thus, it is sufficient for $IMG_{DIV}(U)$ 131, which is provided to the slave processor 102, to at least include an overlapped area that is required by the HFEV obtaining circuit 132 and the image processing circuit 135. As a result, an overlapped area can be reduced, and a reduction in the processing efficiency can be moderated. Furthermore, in the present embodiment, as low-frequency band evaluation values are obtained based on the reduced image, a processing load imposed on the master processor 101 in obtainment of low-frequency band evaluation values is reduced.

Below, the operations of the LFEV obtaining circuit 115 and the HFEV obtaining circuits 116 and 132 will be further described using FIGS. 2A and 2B.

Figure 2A:
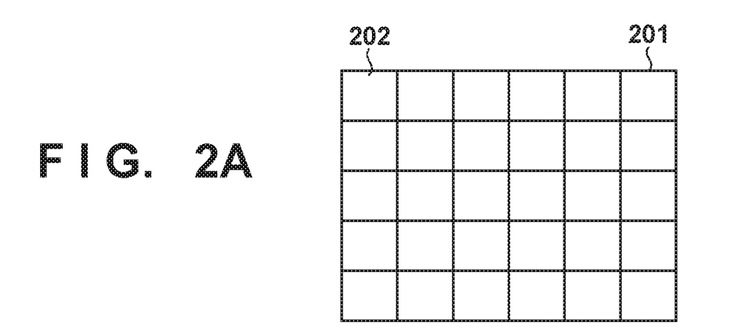
FIGS. 2A and 2B are diagrams for explaining the operations to obtain evaluation values in the first embodiment.

FIG. 2A schematically shows $IMG_R$ 201 used by the LFEV obtaining circuit 115. The LFEV obtaining circuit 115 divides $IMG_R$ 201 into a plurality of rectangle areas 202, and obtains low-frequency band evaluation values by summing pixel values of the rectangle areas 202 on a per-area basis. Although FIG. 2A depicts a case in which adjacent rectangle areas 202 do not overlap, the rectangle areas 202 may be defined in such a manner that adjacent rectangle areas 202 partially overlap.

Figure 2B:
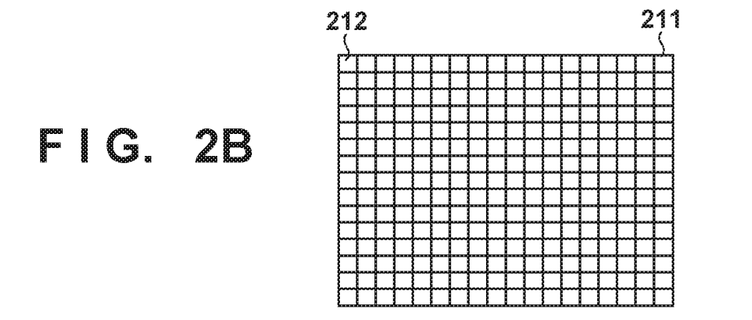

FIG. 2B schematically shows $IMG_{DIV}$ 211 ($IMG_{DIV}(L)$ 114 or $IMG_{DIV}(U)$ 131) used by the HFEV obtaining circuits 116 and 132. The HFEV obtaining circuits 116 and 132 divide $IMG_{DIV}$ 211 into a plurality of rectangle areas 212, and obtain high-frequency band evaluation values by summing pixel values of the rectangle areas 212 on a per-area basis. Although FIG. 2B depicts a case in which adjacent rectangle areas 212 do not overlap, the rectangle areas 212 may be defined in such a manner that adjacent rectangle areas 212 partially overlap.

The LFEV obtaining circuit 115 and the HFEV obtaining circuits 116 and 132 are similar to one another in that they obtain evaluation values by summing pixel values within the rectangle areas. However, the LFEV obtaining circuit 115 uses the reduced image corresponding to one screen, whereas the HFEV obtaining circuits 116 and 132 respectively use unreduced $IMG_{DIV}(L)$ 114 and $IMG_{DIV}(U)$ 131 that are smaller than one screen in size. Furthermore, the rectangle areas 212 defined by the LFEV obtaining circuit 115 are larger than the rectangle areas 202 defined by the HFEV obtaining circuits 116 and 132.

Below, an operation to obtain low-frequency band evaluation values will be further described using FIG. 3A.

Figure 3A:
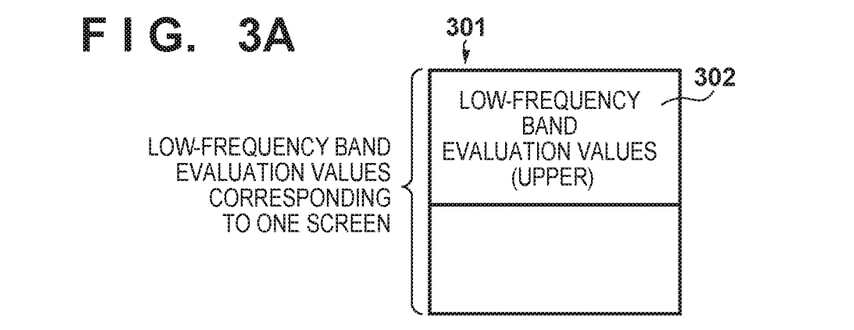
FIGS. 3A and 3B are diagrams for explaining evaluation values according to the first embodiment and a reduced image according to a second embodiment.

FIG. 3A schematically shows LFEV 301 corresponding to one screen obtained by the LFEV obtaining circuit 115. LFEV 301 is obtained by summing pixel values of the rectangle areas 202 (FIG. 2A) on a per-area basis. When $IMG_R$ 201 is input to the LFEV obtaining circuit 115 in raster scan order, a low-frequency band evaluation value related to a certain rectangle area 202 is obtained after a certain period has elapsed since the first pixel of that rectangle area 202 was input in raster scan order.

LFEV(U) 302 is a schematic representation of a portion that is transmitted to the slave processor 102 among LFEV 301 corresponding to one screen. Although LFEV 301 corresponding to one screen may be transmitted to the slave processor 102, the figure depicts a case in which only LFEV 302 equivalent to a range required by the image processing circuit 135 is transmitted.

Figure 4:
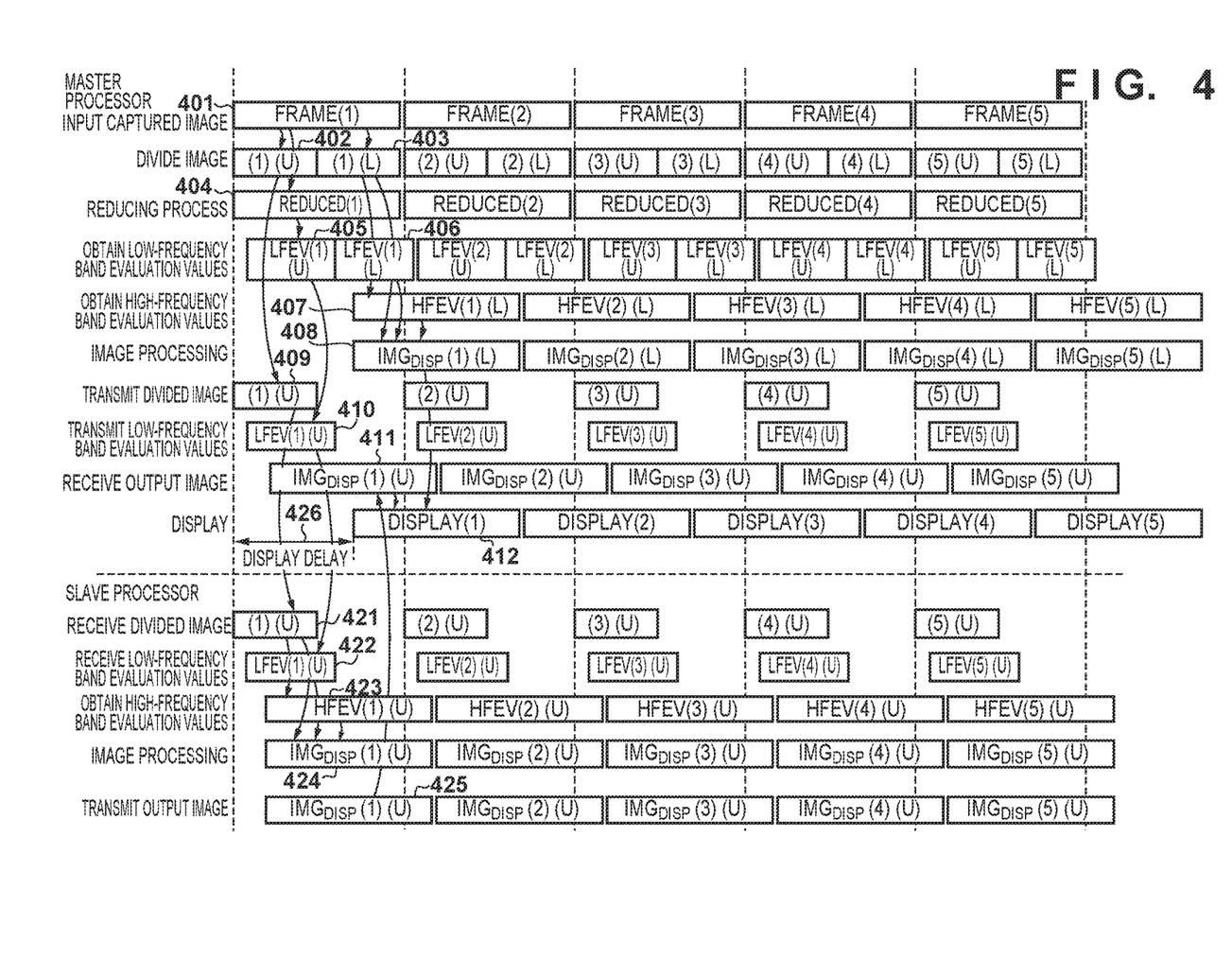
FIG. 4 shows a sequence of processes according to the first embodiment.

Using FIG. 4, the following describes a sequence of processes executed by the master processor 101 and the slave processor 102. In FIG. 4, time elapses in the rightward direction.

First, processes within the master processor 101 will be described.

A period in which the image sensor 103 inputs frame(1) of an image signal to the input circuit 111 is indicated by 401. The same goes for subsequent frame(2) to frame(5). It will be assumed herein that the image sensor 103 inputs an image signal of moving images at a frame rate of 60 fps, for example.

The dividing circuit 113 divides input frame(1) into $IMG_{DIV}(1)$ (U) 402 and $IMG_{DIV}(1)$ (L) 403.

The reducing circuit 112 applies a reducing process to frame(1), and outputs $IMG_R(1)$ 404.

The LFEV obtaining circuit 115 obtains LFEV(1) (U) 405 and LFEV(1) (L) 406 from $IMG_R(1)$ 404 that has been input thereto. LFEV(1) (U) 405 denotes low frequency band evaluation values that are necessary for image processing in the image processing circuit 135, and LFEV(1) (L) 406 denotes low-frequency band evaluation values that are necessary for image processing in the image processing circuit 119.

The HFEV obtaining circuit 116 obtains HFEV(1) (L) 407 from $IMG_{DIV}(1)$ (L) 403, and outputs the same to the image processing circuit 119.

The image processing circuit 119 generates $IMG_{DISP}(1)$ (U) 408 by executing image processing using $IMG_{DIV}(1)$ (L) 403, LFEV (1) (L) 406, and HFEV (1) (L) 407.

$IMG_{DIV}(U)$ 402 is transmitted as $IMG_{DIV}(1)$ (U) 409 to the slave processor 102 via the communication circuit 123.

Furthermore, LFEV(1) (U) 405 is transmitted as LFEV(1) (U) 410 to the slave processor 102 via the communication circuit 123.

$IMG_{DISP}(1)$ (U) 425 generated by the image processing circuit 135 of the slave processor 102 is received as $IMG_{DISP}(1)$ (U) 411 via the communication circuit 123.

The display circuit 121 composites $IMG_{DISP}(1)$ (L) 408 and $IMG_{DISP}(1)$ (U) 411 together, and outputs resultant $IMG_{DISP}(1)$ 412 corresponding to one screen to the monitor 104.

Next, processes within the slave processor 102 will be described.

The slave processor 102 receives $IMG_{DIV}(1)$ (U) 402 as $IMG_{DIV}(U)$ 421 via the communication circuit 138.

The slave processor 102 also receives LFEV(U) 405 as LFEV(U) 422 via the communication circuit 138.

The HFEV obtaining circuit 132 obtains HFEV(1) (U) 423 from $IMG_{DIV}(U)$ 421, and outputs the same to the image processing circuit 135.

The image processing circuit 135 generates $IMG_{DISP}(1)$ (U) 424 from $IMG_{DIV}(1)$ (U) 421, LFEV(U) 422, and HFEV(U) 134 that have been input thereto.

$IMG_{DISP}(1)$ (U) 424 is transmitted as $IMG_{DISP}(1)$ (U) 425 to the display circuit 121 via the communication circuit 138.

In the foregoing manner, the master processor 101 and the slave processor 102 execute a sequence of processes for generating a display image from frame(1) 401 using high-frequency band evaluation values and low-frequency band evaluation values, and such execution is shared by these processors on a per-divided area basis. The master processor 101 and the slave processor 102 generate a display image in a similar manner with respect to frame(2) and subsequent frames.

As shown in FIG. 4, a display delay 426 occurs between input of frame(1) and corresponding display.

In the present embodiment, transmission of low-frequency band evaluation values that are necessary for generating $IMG_{DISP}(U)$ to the slave processor 102 is started immediately after they are obtained without waiting for obtainment of evaluation values related to the entire image. Therefore, the image processing circuit 135 of the slave processor 102 can start a process for generating a display image as soon as it starts obtaining high-frequency band evaluation values. As a result, a period until $IMG_{DISP}(U)$ 424 is generated in the image processing circuit 135 can be shortened, and accordingly, the display delay 426 can be shortened. In the foregoing manner, in order to transmit low-frequency band evaluation values required by the slave processor that does not generate the low-frequency band evaluation values as quickly as possible, $IMG_{DIV}(U)$ from which the low-frequency band evaluation values are obtained first is processed in the slave processor.

Although two processors execute parallel processing in the foregoing description of the present embodiment, an image may be divided into three or more areas, and processors that are equal number to the divided areas may execute similar parallel processing. For example, an image may be divided into three areas in the horizontal direction (divided at two division lines extending in the vertical directions), and each divided area may be processed by a different one of separate processors (that is to say, the total number of the processors is three). In this case also, an overlapped area can be reduced by obtaining low-frequency band evaluation values in one processor and distributing the obtained low-frequency band evaluation values to other processors. When an image is divided into three or more areas, dividing the image in the horizontal direction can moderate a delay in the start of processes in the processors that receive low-frequency band evaluation values, thereby moderating a display delay. Furthermore, an image may be divided into two areas consisting of a right area and a left area. In this case, the master processor is assigned the right divided area.

As described above, the present embodiment adopts a configuration in which each of a plurality of processors applies image processing to a different one of divided areas of an image in parallel using high frequency band evaluation values and low-frequency band evaluation values of the image, and one processor distributes low-frequency band evaluation values to another processor. Therefore, an area of an adjacent divided image that is necessary for obtaining evaluation values (an overlapped area) can be reduced, and a reduction in the processing efficiency can be moderated. Furthermore, as low-frequency band evaluation values are obtained from a reduced image, a load associated with obtainment of the low-frequency band evaluation values can be reduced, and a period required to obtain the low-frequency band evaluation values can be shortened. As a result, a delay in processes executed by a processor that uses the received low-frequency band evaluation values can be shortened, and accordingly, a consequential display delay can be shortened.

Second Embodiment

A second embodiment of the present invention will now be described using FIGS. 5 and 6. The first embodiment adopts a configuration in which a master processor obtains and distributes low-frequency band evaluation values that are required by a slave processor. In contrast, the present embodiment differs in that a master processor distributes a reduced image to a slave processor, and the slave processor obtains low-frequency band evaluation values on an individual basis.

Figure 5:
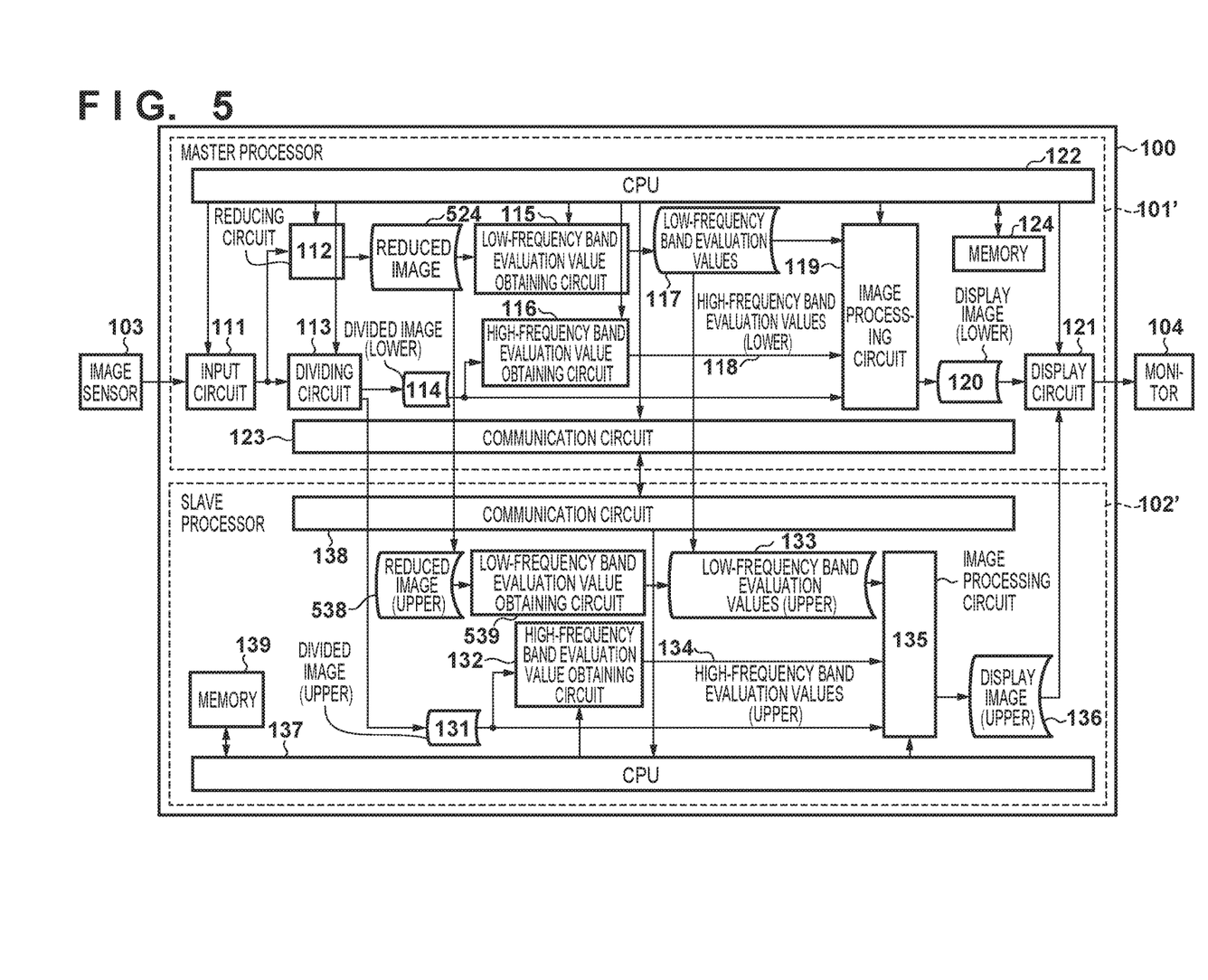
FIG. 5 is a block diagram showing an exemplary functional configuration of a digital camera according to the second embodiment.

FIG. 5 is a block diagram showing an exemplary functional configuration of a digital camera according to the second embodiment in connection with generation and output of display image data. In FIG. 5, components that are similar to components according to the first embodiment are given the same reference numerals as in FIG. 1. The following description focuses on differences from the first embodiment.

In the present embodiment, $IMG_R$ 524 generated by a reducing circuit 112 of a master processor 101' is output to an LFEV obtaining circuit 115 and temporarily written to a memory 124. Then, a CPU 122 transmits a part of $IMG_R$ 524 that is required by an LFEV obtaining circuit 539 of a slave processor 102' ($IMG_R(U)$ 538) to the slave processor 102' via a communication circuit 123. This part of $IMG_R$ 524 that is transmitted as $IMG_R(U)$ 538 to the slave processor 102' can be determined in advance in consideration of an overlapped area required by the LFEV obtaining circuit 539 of the slave processor 102'. Although it is possible to perform writing and reading of data to and from the memory 124 in parallel in the present embodiment as well, the CPU 122 controls writing and reading of data to and from the memory 124 so as to avoid reading of unwritten data, for example.

In the present embodiment, it is sufficient for the LFEV obtaining circuit 115 to obtain LFEV 117 related to a range required by an image processing circuit 135 of the master processor 101'. Note that LFEV 117 is not transmitted to the slave processor 102'.

Other components of the master processor 101' function similarly to their counterparts according to the first embodiment.

The slave processor 102' according to the present embodiment includes the LFEV obtaining unit 529. Upon receiving $IMG_R(U)$ 538 from the master processor 101' via a communication circuit 138, a CPU 137 temporarily writes the same to a memory 139.

The LFEV obtaining circuit 539 reads out $IMG_R$ 538 from the memory 139, and similarly to the LFEV obtaining circuit 115, obtains LFEV(U) 133 from $IMG_R(U)$ 538 and outputs the same to an image processing circuit 135. Although it is possible to perform writing and reading of data to and from the memory 139 in parallel in the present embodiment as well, the CPU 137 controls writing and reading of data to and from the memory 139 so as to avoid reading of unwritten data, for example.

As stated earlier, an overlapped area that is necessary for obtaining low-frequency band evaluation values is larger than an overlapped area that is necessary for obtaining high-frequency band evaluation values and generating a display image. However, in the present embodiment, as low-frequency band evaluation values are obtained from a reduced image, the size of an overlapped area necessary for $IMG_{DIV}(U)$ 131 is the same as in the first embodiment. Furthermore, as $IMG_R(U)$ 538 has been significantly reduced in data amount compared with an unreduced image, an increase in an amount of data that the slave processor 102' receives from the master processor 101' is not significant.

Other function blocks within the slave processor 102' are similar to their counterparts according to the first embodiment.

Figure 3B:
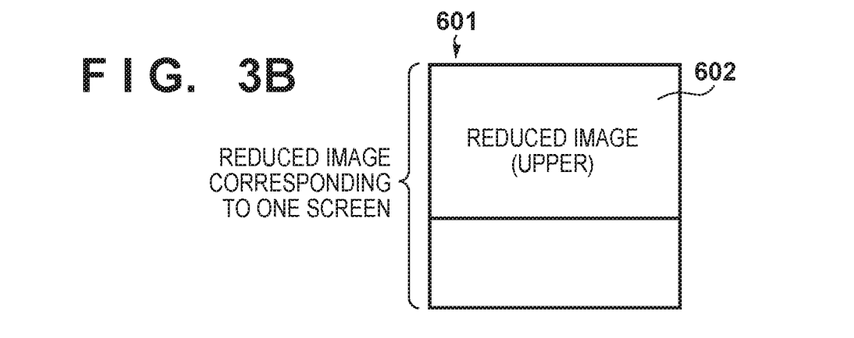

FIG. 3B schematically shows a reduced image generated by the reducing circuit 112. In the figure, 601 denotes a reduced image ($IMG_R$) corresponding to one screen, and 602 denotes a reduced image (upper) or $IMG_R(U)$ required by the LFEV obtaining circuit 539 of the slave processor 102'. As $IMG_RM$ 602 includes an overlapped area required by the LFEV obtaining circuit 539, it is larger than the upper half of $IMG_R$ 601 corresponding to one screen.

Figure 6:
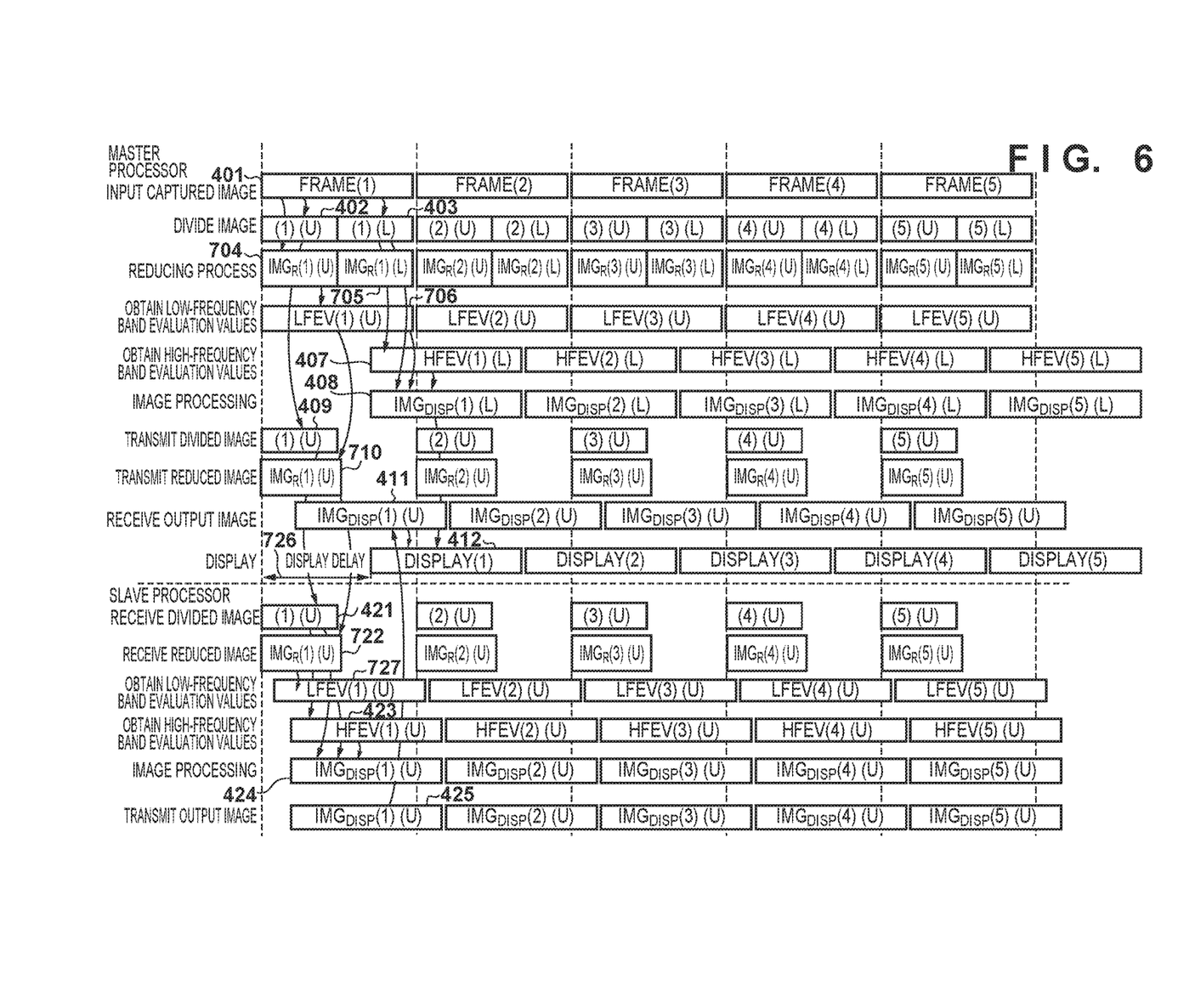
FIG. 6 shows a sequence of processes according to the second embodiment.

Using FIG. 6, the following describes a sequence of processes executed by the master processor 101' and the slave processor 102'. In FIG. 6, time elapses in the rightward direction. Furthermore, processes that are similar to processes according to the first embodiment are given the same reference numerals thereas. The following describes differences from the first embodiment.

First, processes within the master processor 101' will be described.

In the present embodiment, the reducing circuit 112 generates $IMG_R(1)$ (U) 704 and $IMG_R(1)$ (L) 705, and $IMG_R(1)$ (U) 704 is transmitted as $IMG_R(1)$ (U) 710 to the slave processor 102' via the communication circuit 123.

Low-frequency band evaluation values obtained by the LFEV obtaining circuit 115 are not transmitted to the slave processor 102'. Although FIG. 6 depicts a case in which the LFEV obtaining circuit 115 generates low-frequency band evaluation values related to the entire reduced image, it may generate low-frequency band evaluation values (lower).

Other processes are similar to their counterparts according to the first embodiment.

The slave processor 102' is similar to its counterpart according to the first embodiment, except that it receives $IMG_R(1)$ (U) 722 and causes the LFEV obtaining circuit 539 to additionally execute a process for obtaining LFEV(1) (U) 727.

In the foregoing manner, the master processor 101' and the slave processor 102' execute a sequence of processes for generating a display image from frame(1) 401 using high-frequency band evaluation values and low-frequency band evaluation values, and such execution is shared by these processors on a per-divided area basis. The master processor 101' and the slave processor 102' generate a display image in a similar manner with respect to frame and subsequent frames.

In the present embodiment also, a display delay 726 occurs between input of frame(1) and corresponding display.

In the present embodiment, transmission of a reduced image of a range that is necessary for obtaining low-frequency band evaluation values that are necessary for generating a display image (upper) to the slave processor 102' is promptly started without waiting for completion of a reducing process for the entire image (710 of FIG. 6). Therefore, the LFEV obtaining circuit 539 of the slave processor 102' can promptly start a process for obtaining low-frequency band evaluation values (727 of FIG. 6). As a result, a period until $IMG_{DISP}(U)$ 424 is generated in the image processing circuit 135 can be shortened, and accordingly, the display delay 726 can be shortened.

In the present embodiment also, an image may be divided into three or more areas, and processors that are equal in number to the divided areas may execute similar parallel processing as in the first embodiment. In this case also, an overlapped area can be reduced by generating a reduced image in one processor and distributing (the entire or a necessary range of) the reduced image to other processors. When an image is divided into three or more areas, dividing the image in the horizontal direction can moderate a delay in the start of processes in the processors that receive the reduced image, thereby moderating a display delay. Furthermore, an image may be divided into two areas consisting of a right area and a left area. In this case, the master processor is assigned the right divided area.

The present embodiment adopts a configuration in which each of a plurality of processors applies image processing to a different one of divided areas of an image in parallel using high-frequency band evaluation values and low-frequency band evaluation values of the image, and one processor distributes a reduced image for obtaining low-frequency band evaluation values to another processor. Therefore, an area of an adjacent divided image that is necessary for obtaining evaluation values (an overlapped area) can be reduced, and a reduction in the processing efficiency can be moderated. Furthermore, as low-frequency band evaluation values are obtained from a reduced image, a load associated with obtainment of the low-frequency band evaluation values can be reduced, and a period required to obtain the low-frequency band evaluation values can be shortened. As a result, a delay in processes executed by a processor that uses the received low-frequency band evaluation values can be shortened, and accordingly, a consequential display delay can be shortened.

For example, when a data amount of low-frequency band evaluation values is larger than a data amount of a reduced image, such as when different types of low-frequency band evaluation values are obtained, the configuration of the present invention can reduce a communication data amount and a processing load imposed on the slave processor compared with the configuration of the first embodiment. Therefore, it is possible to adopt a mode that can switch between the configuration of the first embodiment and the configuration of the second embodiment. For example, data transmitted from the master processor to the slave processor may be dynamically changed while comparing a data amount of low-frequency band evaluation values with a data amount of a reduced image. Furthermore, in accordance with a combination of settings of low-frequency band evaluation values to be obtained and settings of a reduced image to be obtained, either the low-frequency band evaluation values or the reduced image may be determined as an item(s) to be transmitted from the master processor to the slave processor. For example, in the configuration shown in FIG. 1, the configuration according to the second embodiment can be realized by the CPU 137 implementing the functions of the LFEV obtaining circuit 539 through execution of a program. On the other hand, in the configuration shown in FIG. 5, the configuration according to the first embodiment can be realized by transmitting LFEV(U) 133 to the slave processor in place of a reduced image so as to invalidate the operations of the LFEV obtaining circuit 539.

Although the present invention has been described based on exemplary embodiments thereof, the present invention is not limited to these embodiments, and various modifications and changes can be made to the present invention within the scope defined by the claims.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU))) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has bees described with reference to exemplary embodiments, it is to be understood that the invention is not limited to the disclosed exemplary embodiments. The scope of the following claims is to be accorded the broadest interpretation so as to encompass ail such modifications and equivalent structures and functions.

This application claims the benefit of Japanese Patent Application No. 2016-189920, filed on Sep. 28, 2016, which is hereby incorporated by reference herein in its entirety.

What is claimed is:

1. An image processing apparatus, comprising:
a first processor that applies first image processing to a first partial image that is generated from an input image and corresponds to a first region of the input image;
a second processor that applies second image processing to a second partial image that is generated from the input image and corresponds to a second region of the input image being different from the first region, wherein the first region and the second region are partially overlapped with each other; and
a composite circuit that composites the first partial image on which the first image processing has been applied and the second partial image on which the second image processing has been applied to generate a composite image, wherein
the first processor:
calculates first evaluation values for a first frequency band of the first partial image;
calculates second evaluation values for a second frequency band, which is lower than the first frequency band, of a reduced image of the input image;
transmits evaluation values for a region of the reduced image that corresponds to the second partial image, from among the second evaluation values, to the second processor; and
applies the first image processing to the first partial image based on: the first evaluation values, and evaluation values for a region of the reduced image that corresponds to the first partial image from among the second evaluation values, and
the second processor:
calculates third evaluation values for the first frequency band of the second partial image; and
applies the second image processing to the second partial image based on the third evaluation values and the evaluation values received from the first processor.

2. The image processing apparatus according to claim 1, wherein the first processor further generates, from the input image, the first partial image and the second partial image.

3. The image processing apparatus according to claim 2, wherein
a size of an overlapped area between the first partial image and the second partial image is determined based on sizes of an overlapped area that is necessary for generating the evaluation values for the first frequency band.

4. The image processing apparatus according to claim 1, wherein
the first processor includes a reducing circuit that generates the reduced image from the input image.

5. The image processing apparatus according to claim 1, wherein
the first partial image is an upper partial image of the input image and the second partial image is a lower partial image of the input image.

6. The image processing apparatus according to claim 1, wherein
the first partial image is a left partial image of the input image and the second partial image is a right partial image of the input image.

7. The image processing apparatus according to claim 1, wherein
the input image is a moving image.

8. The image processing apparatus according to claim 1, wherein:
the first partial image is consist of a third region that is not overlapped with the second partial image and a fourth region that is overlapped with the second partial image, and
the fourth region includes a region of the input image that is necessary to calculate evaluation values for the first frequency band of the third region.

9. The image processing apparatus according to claim 8, wherein:
the fourth region does not include a part of a region of the input image that is necessary to calculate evaluation values for the second frequency band of the third region.

10. An image capture apparatus, comprising:
an image sensor, and
an image processing apparatus,
wherein the image processing apparatus comprises:
a first processor that applies first image processing to a first partial image that is generated from an input image obtained by the image sensor and corresponds to a first region of the input image;
a second processor that applies second image processing to a second partial image that is generated from the input image and corresponds to a second region of the input image being different from the first region, wherein the first region and the second region are partially overlapped with each other; and
a composite circuit that composites the first partial image on which the first image processing has been applied and the second partial image on which the second image processing has been applied to generate a composite image, wherein
the first processor:
calculates first evaluation values for a first frequency band of the first partial image;
calculates second evaluation values for a second frequency band, which is lower than the first frequency band, of a reduced image of the input image:
transmits evaluation values for a region of the reduced image that corresponds to the second partial image, from among the second evaluation values, to the second processor; and
applies the first image processing to the first partial image based on: the first evaluation values, and evaluation values for a region of the reduced image that corresponds to the first partial image from among the second evaluation values, and
the second processor:
calculates third evaluation values for the first frequency band of the second partial image; and
applies the second image processing to the second partial image based on the third evaluation values and the evaluation values received from the first processor.

11. An image processing method, comprising:
applying, by a first processor, first image processing to a first partial image that is generated from an input image and corresponds to a first region of the input image;
applying, by a second processor, second image processing to a second partial image that is generated from the input image and corresponds to a second region of the input image being different from the first region, wherein the first region and the second region are partially overlapped with each other; and
compositing the first partial image on which the first image processing has been applied and the second partial image on which the second image processing has been applied to generate a composite image, wherein
the applying first image processing to the first partial image comprises:
calculating first evaluation values for a first frequency band of the first partial image;
calculating second evaluation values for a second frequency band, which is lower than the first frequency band, of a reduced image of the input image;
transmitting evaluation values for a region of the reduced image that corresponds to the second partial image, from among the second evaluation values, to the second processor:
applying the first image processing to the first partial image based on: the first evaluation values, and evaluation values for a region of the reduced image that corresponds to the first partial image from among the second evaluation values, and
the applying the second image processing to the second partial image comprises:
calculating third evaluation values for the first frequency band of the second partial image; and
applying the second image processing to the second partial image based on the third evaluation values and the evaluation values received from the first processor.

12. A non-transitory computer-readable medium having stored therein a program for causing a computer to function as an image processing apparatus comprises:
a first processor that applies first image processing to a first partial image that is generated from an input image and corresponds to a first region of the input image;
a second processor that applies second image processing to a second partial image that is generated from the input image and corresponds to a second region of the input image being different from the first region, wherein the first region and the second region are partially overlapped with each other; and
a composite unit that composites the first partial image on which the first image processing has been applied and the second partial image on which the second image processing has been applied to generate a composite image, wherein
the first processor:
calculates first evaluation values for a first frequency band of the first partial image;
calculates second evaluation values for a second frequency band, which is lower than the first frequency band, of a reduced image of the input image;
transmits evaluation values for a region of the reduced image that corresponds to the second partial image, from among the second evaluation values, to the second processor; and
applies the first image processing to the first partial image based on: the first evaluation values, and evaluation values for a region of the reduced image that corresponds to the first partial image from among the second evaluation values, and
the second processor:
calculates third evaluation values for the first frequency band of the second partial image; and
applies the second image processing to the second partial image based on the third evaluation values and the evaluation values received from the first processor.

13. An image processing apparatus, comprising:
a first processor that applies first image processing to a first partial image that is generated from an input image and corresponds to a first region of the input image;
a second processor that applies second image processing to a second partial image that is generated from the input image and corresponds to a second region of the input image being different from the first region, wherein the first region and the second region are partially overlapped with each other; and a composite circuit that composites the first partial image on which the first image processing has been applied and the second partial image on which the second image processing has been applied to generate a composite image, wherein the first processor:
  calculates first evaluation values for a first frequency band of the first partial image;
  generates, from the input image, a reduced image being smaller than the input image;
  calculates second evaluation values for a second frequency band, which is lower than the first frequency band, of a third partial image of an reduced image that corresponds to the first partial image;
  transmits a fourth partial image of the reduced image that corresponds to the second partial image to the second processor; and
  applies the first image processing to the first partial image based on the first evaluation values and the second evaluation values, and the second processor:
  calculates third evaluation values for the first frequency band of the second partial image;
  calculates fourth evaluation values for the second frequency band of the fourth partial image received from the first processor, and
  applies the second image processing to the second partial image based on the third evaluation values and the fourth evaluation values.

14. An image capture apparatus, comprising:
an image sensor; and
an image processing apparatus,
wherein the image processing apparatus comprises:
  a first processor that applies first image processing to a first partial image that is generated from an input image obtained by the image sensor and corresponds to a first region of the input image;
  a second processor that applies second image processing to a second partial image that is generated from the input image and corresponds to a second region of the input image being different from the first region, wherein the first region and the second region are partially overlapped with each other; and
  a composite circuit that composites the first partial image on which the first image processing has been applied and the second partial image on which the second image processing has been applied to generate a composite image, wherein the first processor:
  calculates first evaluation values for a first frequency band of the first partial image;
  generates, from the input image, a reduced image being smaller than the input image;
  calculates second evaluation values for a second frequency band, which is lower than the first frequency band, of a third partial image of an reduced image that corresponds to the first partial image;
  transmits a fourth partial image of the reduced image that corresponds to the second partial image to the second processor; and
  applies the first image processing to the first partial image based on the first evaluation values and the second evaluation values, and the second processor:
  calculates third evaluation values for the first frequency band of the second partial image;
  calculates fourth evaluation values for the second frequency band of the fourth partial image received from the first processor, and
  applies the second image processing to the second partial image based on the third evaluation values and the fourth evaluation values.

15. An image processing method, comprising:
applying, by a first processor, first image processing to a first partial image that is generated from an input image and corresponds to a first region of the input image;
applying, by a second processor, second image processing to a second partial image that is generated from the input image and corresponds to a second region of the input image being different from the first region, wherein the first region and the second region are partially overlapped with each other, and
compositing the first partial image on which the first image processing has been applied and the second partial image on which the second image processing has been applied to generate a composite image, wherein the applying the first image processing to the first partial image comprises:
  calculating first evaluation values for a first frequency band of the first partial image;
  generating, from the input image, a reduced image being smaller than the input image;
  calculating second evaluation values for a second frequency band, which is lower than the first frequency band, of a third partial image of an reduced image that corresponds to the first partial image;
  transmitting a fourth partial image of the reduced image that corresponds to the second partial image to the second processor; and
  applying the first image processing to the first partial image based on the first evaluation values and the second evaluation values, and the applying the second image processing to the second partial image comprises:
  calculating third evaluation values for the first frequency band of the second partial image;
  calculating fourth evaluation values for the second frequency band of the fourth partial image received from the first processor, and
  applying the second image processing to the second partial image based on the third evaluation values and the fourth evaluation values.

16. A non-transitory computer-readable medium having stored therein a program for causing a computer to function as an image processing apparatus comprises:
  a first processor that applies first image processing to a first partial image that is generated from an input image and corresponds to a first region of the input image;
  a second processor that applies second image processing to a second partial image that is generated from the input image and corresponds to a second region of the input image being different from the first region, wherein the first region and the second region are partially overlapped with each other; and
  a composite unit that composites the first partial image on which the first image processing has been applied and the second partial image on which the second image processing has been applied to generate a composite image, wherein the first processor:

calculates first evaluation values for a first frequency band of the first partial image;
generates, from the input image, a reduced image being smaller than the input image;
calculates second evaluation values for a second frequency band, which is lower than the first frequency band, of a third partial image of an reduced image that corresponds to the first partial image;
transmits a fourth partial image of the reduced image that corresponds to the second partial image to the second processor, and
applies the first image processing to the first partial image based on the first evaluation values and the second evaluation values, and the second processor:
calculates third evaluation values for the first frequency band of the second partial image;
calculates fourth evaluation values for the second frequency band of the fourth partial image received from the first processor; and
applies the second image processing to the second partial image based on the third evaluation values and the fourth evaluation values.

\* \* \* \* \*